(12) United States Patent
Frich

(10) Patent No.: US 7,004,709 B2
(45) Date of Patent: Feb. 28, 2006

(54) BIN FOR LIBRARY ARTICLES AND AUTOMATIC UNLOADING SYSTEM THEREFOR

(75) Inventor: Mark R. Frich, Maplewood, MN (US)

(73) Assignee: Tech Logic Corporation, White Bear, MN (US)

( * ) Notice: Subject to any disclaimer, the term of this patent is extended or adjusted under 35 U.S.C. 154(b) by 344 days.

(21) Appl. No.: 10/287,939

(22) Filed: Nov. 4, 2002

(65) Prior Publication Data

US 2003/0123960 A1   Jul. 3, 2003

Related U.S. Application Data

(60) Provisional application No. 60/338,899, filed on Nov. 5, 2001.

(51) Int. Cl.
*B65G 65/34* (2006.01)
(52) U.S. Cl. ............... 414/362; 414/419; 414/422; 271/152; 187/244
(58) Field of Classification Search ........... 414/419, 414/421, 422, 362; 271/152, 162; 187/244
See application file for complete search history.

(56) References Cited

U.S. PATENT DOCUMENTS

| | | | | |
|---|---|---|---|---|
| 2,581,887 A | * | 1/1952 | Saxton et al. ............... | 187/246 |
| 5,284,335 A | * | 2/1994 | Golicz ............... | 271/149 |
| 5,469,936 A | * | 11/1995 | Lauga et al. ............... | 187/205 |
| 6,247,694 B1 | * | 6/2001 | Nonnemacher et al. ...... | 271/146 |
| 6,268,151 B1 | * | 7/2001 | Murray et al. ............... | 435/6 |

* cited by examiner

Primary Examiner—Thomas J. Brahan
(74) Attorney, Agent, or Firm—Robert A. Paiak

(57) ABSTRACT

A bin for library articles and an automatic unloading system therefor includes a bin housing having a chamber defined by an uppermost housing plane and by opposing walls. A floor within the chamber has a top and bottom surfaces, and a plurality of cable apertures. A plurality of cables suspend the floor within the chamber, and are fixed at one end to the walls. The cables pass through the cable apertures in the floor, and are secured to a reversible cable driver which is, in turn, secured to the bottom surface of the floor. Clockwise rotational motive force of the driver causes the floor member to climb upward on the cables to the uppermost housing plane, while counter-clockwise rotational motive force causes the floor to descend downward from the housing plane. The automatic unloading system has a receiving frame for receiving the bin, and a frame tilting means for tilting the receiving frame when said bin is located thereon, such that articles present on the floor at the uppermost housing plane may freely slide off of the floor and away from the bin.

10 Claims, 4 Drawing Sheets

View A

BIN FOR LIBRARY ARTICLES AND AUTOMATIC UNLOADING SYSTEM THEREFOR

REFERENCE TO RELATED APPLICATION

This patent application claims the benefit of a filing date of U.S. Provisional Patent Application Ser. No. 60/338,899, filed Nov. 5, 2001, and entitled "LIBRARY MATERIALS HANDLING SYSTEM", the entire contents thereof being incorporated herein by reference thereto.

FIELD OF THE INVENTION

The present invention relates generally to a storage receptacle or bin for library articles. The invention relates specifically to an automatic level-sensing bin for automatically sensing and adjusting height levels of articles placed therein, and to an unloading system for automatically unloading the bin.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever-increasing volumes are often overwhelming.

Particularly problematic librarian tasks involve receiving, sorting, and ultimately re-shelving material returned from patrons. Tasks of repeatedly manipulating materials in receiving, sorting, and re-shelving, are tedious and have lead to repetitive stress-type physical injuries.

In particular response to the foregoing problems, U.S. Pat. No. 6,000,770 issued to Mark R. Frich (the '770 patent) discloses a "LIBRARY BOOK BIN WITH A VERTICALLY ADJUSTABLE FLOOR". The '770 patent is fully incorporated herein by reference thereto. The '770 patent is directed to an exemplary SMART BIN® brand of bins for library articles, commercially available from the Tech Logic Corporation of Maplewood, Minn. This exemplary brand of bins features a four-wall bin housing having an uppermost housing plane, and a vertically adjustable floor which is suspended within the housing by cables. The cables pass through a plurality of supports or pulleys, and are wound around a cylindrical drive member coupled to a reversible motor with a power off brake. The cylindrical cable drive member is rotatably disposed about an axle passing through the walls of the bin. The cylindrical cable drive member includes at least one pair of right hand and left hand spiraling grooves having a depth and width sufficient to wind the cables thereon in a single layer. A library article level sensor is mounted to the bin for sensing the presence or absence of library articles above the floor, at a pre-set access level. The sensor's output is provided as an input to a control circuit for maintaining the highest most ones of the articles on the floor at the preset level, to provide a constant article load and article unload floor level.

Although such bins under the '770 patent have alleviated nearly all of the aforementioned problems encountered by libraries, additional needs have subsequently been identified. Chief among these is a desire that the suspended floor be capable of reaching the uppermost housing plane so that none of the walls interfere with or "block" sliding movement of articles from the floor and out of the bin in an unloading operation. Also, it is desired that the bin be completely automatic or "hands free" in loading and unloading operations.

Thus, there exists a need for a bin for library articles and an automatic unloading system therefor, in which a floor of the bin is capable of reaching an uppermost housing plane of the bin, and in which completely "hands free" operations are provided.

SUMMARY OF THE INVENTION

An object of the present invention is to provide a bin for library articles deposited therein, which maintains the uppermost articles stacked on a floor of the bin at a pre-set access level or height.

Another object of the present invention is to provide a bin for library articles in which the floor of the bin is capable of reaching an uppermost housing plane of the bin.

A further object of the present invention is to provide a bin for library articles and an automatic unloading system therefor, in which completely "hands free" operations are provided.

A still further object of the present invention is to bin that is easily mobile and transportable.

In accordance with the present invention, a bin for library articles and an automatic unloading system therefor includes a bin housing having a chamber defined by an uppermost housing plane and by opposing walls. A floor within the chamber has a top and bottom surfaces, and a plurality of cable apertures. A plurality of cables suspend the floor within the chamber, and are fixed at one end to the walls. The cables pass through the cable apertures in the floor, and are secured to a reversible cable driver which is, in turn, secured to the bottom surface of the floor. Clockwise rotational motive force of the driver causes the floor member to climb upward on the cables to the uppermost housing plane, while counter-clockwise rotational motive force causes the floor to descend downward from the housing plane. The automatic unloading system has a receiving frame for receiving the bin, and a frame tilting means for tilting the receiving frame when said bin is located thereon, such that articles present on the floor at the uppermost housing plane may freely slide off of the floor and away from the bin.

DETAILED DESCRIPTION OF THE INVENTION

Figure 1:
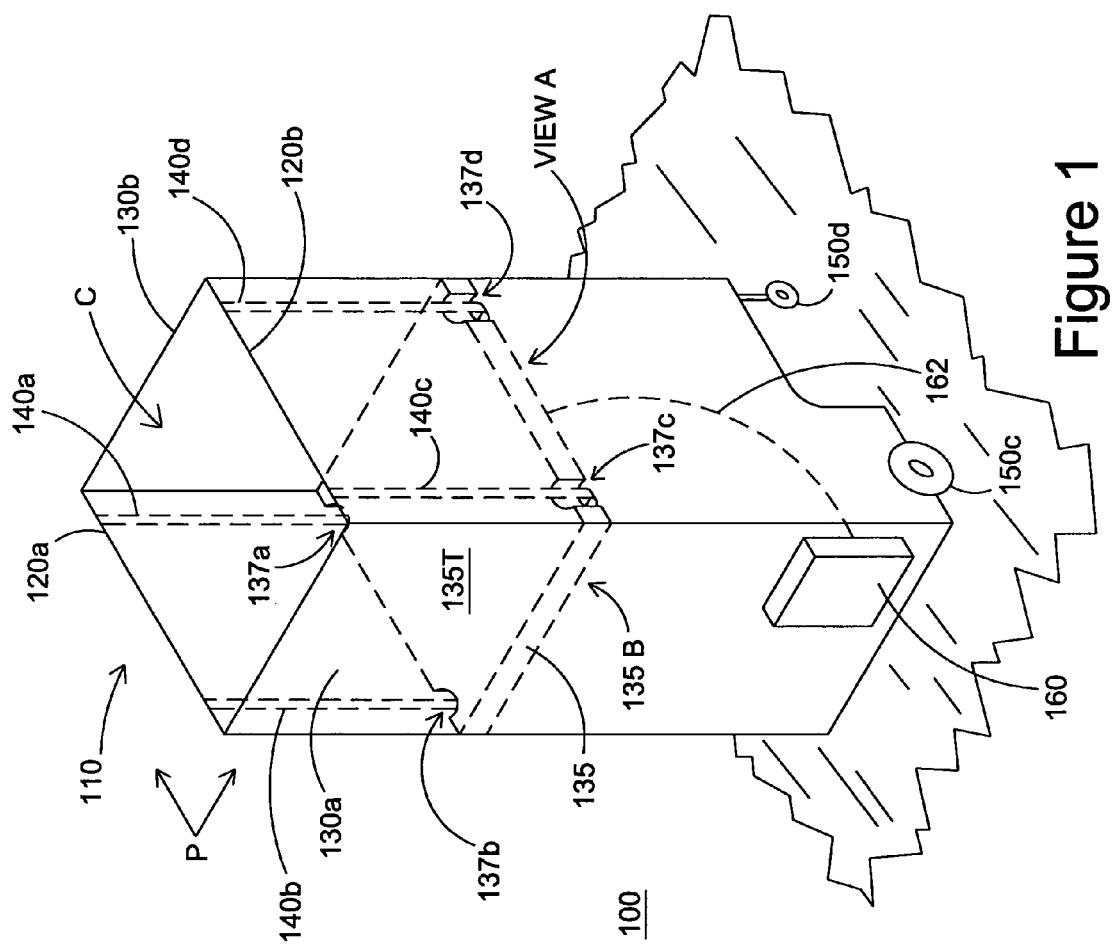
FIG. 1 is a perspective illustration of a bin for library articles constructed in accordance with the present invention.
Figure 1A:
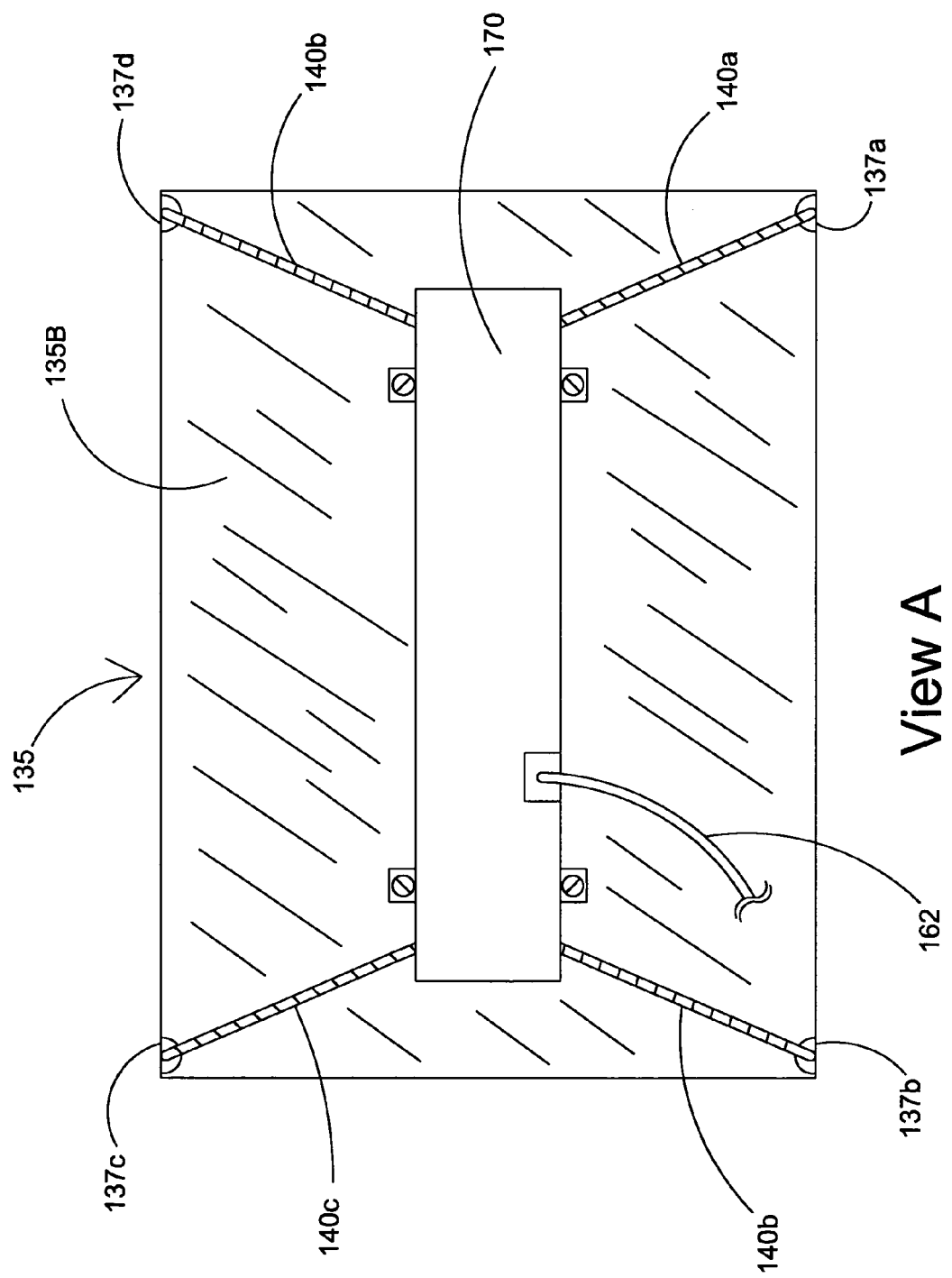
FIG. 1a is an illustration of a component of the bin of FIG. 1 viewed in a direction of "A" therein.

Referring to FIGS. 1 and 1a, there shown are a perspective illustration and an underside view, respectively, of the bin for library articles and component thereof, of the present invention. As used here throughout, "library articles" includes any conventional library material such as, but not limited to, a bound book, a "paperback" book, a materials container (such as a magazine series receptacle or holder), a diskette cassette, video or audio tapes, compact discs, or any other tangible media that may have dimensions or an appearance similar or analogous to a conventional book, or which may be obtained by library patrons. In FIGS. 1–1a, bin for library articles 100 (hereinafter, "bin 100") is illustrated in transparent schematic fashion, so that inner details may be readily ascertained, as will now be described.

Bin 100 includes a generally rectangular or box-like open-top container or bin housing 110 forming a chamber C by way of substantially vertical opposing side wall members 120a–b, and substantially vertical forward and rearward wall members 130a–b, respectively. An uppermost housing plane P is defined by vertically uppermost surfaces of wall members 120a–b and 130a–b forming a plane there across.

Bin 100 further includes a vertically adjustable horizontal floor member 135 (hereinafter, "floor 135") having a top surface 135T and a bottom surface 135B. Floor 135 is suspended and maintained in a position substantially in parallel with uppermost housing plane P by way of cables 140a–d, and a reversible cable driver 170 (as will be described relative to FIG. 1a). Floor 135 also has opposing cable apertures 137a–d, which accommodate passage of cables 140a–d, respectively, through floor 135. Although not shown, small pulleys or reinforced guides may be provided at apertures 137a–d, to facilitate relative movement of cables 140a–d there through. Cables 140a–b and 140c–d are secured at their first cable ends to wall members 120a and 120b, respectively, by way of, preferably, spot welding. The securing of the first cable ends is provided to be as close as possible to uppermost housing plane P, for unrestricted movement of floor 135 in operation of bin 100 as will be described. Cables 170a–d are preferably constructed from industrial cable stock having a diameter of 5/32".

Ground mobility or transport of bin 100 is made possible by way of a plurality of wheels 150a–d located about the periphery of bin 100 (150a–b not visible), and are secured to bottom portions of bin housing 110 in any suitable manner. In one embodiment of the invention, wheels 150a and d are swivel-type wheeled casters, each having a 5" diameter and a 300 lb. capacity, while wheels 150b–c are non-skid rubber wheels each having a 10" diameter and a 300 lb. capacity. Although not illustrated, bin 100 may be provided with one or more central pivot wheels as shown in the '770 patent.

A power supply 160 is preferably provided for operation of bin 100, which may be any suitable battery-type device for supplying electrical energy to reversible cable driver 170 through insulated conductor 162.

With reference, now, to FIG. 1a, bottom surface 135B of floor 135 is depicted relative to view "A" in FIG. 1. As shown, reversible cable driver 170 is secured to surface 135B by way of, for example, industrial screw-type fasteners. Preferably, reversible cable driver 170 may be any suitable motor device for winding cables, such as the combination of a drive motor, a cable drive member, a "power off" motor brake, and other accompanying components disclosed in the '770 patent. Upon examination of this exemplary drive combination of the '770 patent, it is to be understood that reversible cable driver 170 is capable of providing both a clockwise and a counter-clockwise rotational motive force to cables 140a–d. It is therefore to be appreciated that such alternative motive forces cause floor 135 to climb upward on the cables toward uppermost housing plane P and to, alternatively, descend downward thereon from plane P.

Housing 110, although illustrated in the Figures as a box-like shape, may be characterized as any desired shape (i) having an open top end for loading and unloading library articles, (ii) which permits a floor to be raised or lower therein, and (iii) includes surrounding walls to hold library articles on the floor as it is raised and lowered.

Wall members 120a–b and 130a–b may be structurally interconnected by a wide variety of techniques including, for example, use of lateral reinforcing members (not illustrated) to form a structurally rigid open top container. The lateral reinforcing members may be fabricated right-angle members associated with each wall member 120a–b and 130a–b. In one embodiment of the invention, wall members 120a–b and 130a–b, and floor 135, are constructed from aluminum sheet metal material of sufficient thickness for constructing a structurally rigid container and for providing sufficient durability in a heavy use environment.

Vertical positioning of floor 135 is detected by a library article level sensing means illustrated in FIG. 1 as including a signal sending unit 180 and a cooperating signal receiving unit 181, each secured to forward and rearward wall members 130a–b, respectively, of housing 110. Sensor elements 180 and 181 may be, for example, visible beam photo-eye receiver/sender elements. Elements 180–181 are operatively arranged to sense a presence or absence of library articles at or in close proximity to uppermost housing plane P, thereby defining a pre-set access level. Elements 180–181 then responsively provide an output indicative of the presence or absence of the library articles on floor 135 at the pre-set access level, to control reversible cable driver 170 in a manner as taught in the '770 patent.

Overall control of bin 100 in accordance with the present invention, may be by way of, for example, a driver control means comprising a control system and control circuitry as particularly taught in FIGS. 7 and 8 of the '770 patent. Such an exemplary driver control means provides for raising and lowering of floor 135 for either loading or unloading cycles. The exemplary control circuitry is in communication with sensor elements 180–181, as additionally taught in the '770 patent. Further, upper and lower limit sensing means may be provided in bin 100, to provide upper and lower vertical safety travel limits for floor 135.

Although not illustrated, it is to be appreciated that a control panel unit (or "direct user interface") could be secured to housing 110, for providing autonomous, on-board individual control of bin 100. Such control, via the control panel unit, could be achieved by way of any number of made-to-order commercially available devices and techniques.

Figure 2:
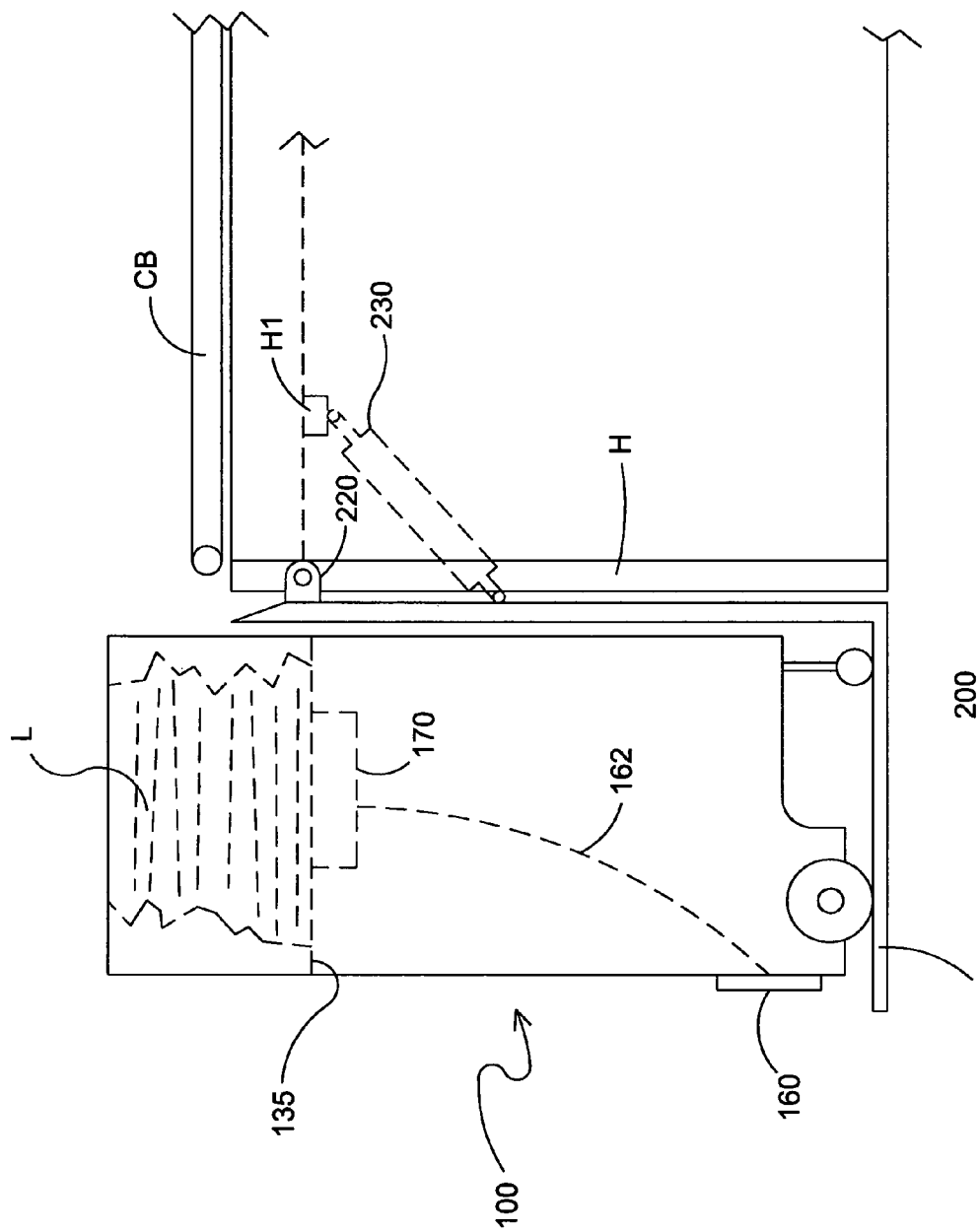
FIG. 2 is a side view of the bin of FIG. 1 in combination with an automatic unloading system.

With reference, now, to FIG. 2, an exemplary unloading system 200 for library articles (generally indicated as "L") in bin 100 is depicted in partially transparent fashion. System 200 includes a generally right-angled receiving frame 210 that is pivotally joined by way of pivot member 220 to a fixed frame or housing H. System 200 also includes a frame tilting means 230 comprising, for example, a commercially available controllable hydraulic piston. As shown and as is well known in operation of such hydraulic devices, frame tilting means 230 is itself pivotally coupled to frame 210 and to a suitable hard point (H1) on housing H. A conveyor belt CB, as will be described in operation of system 200, may also be provided on housing H.

Figure 2A:
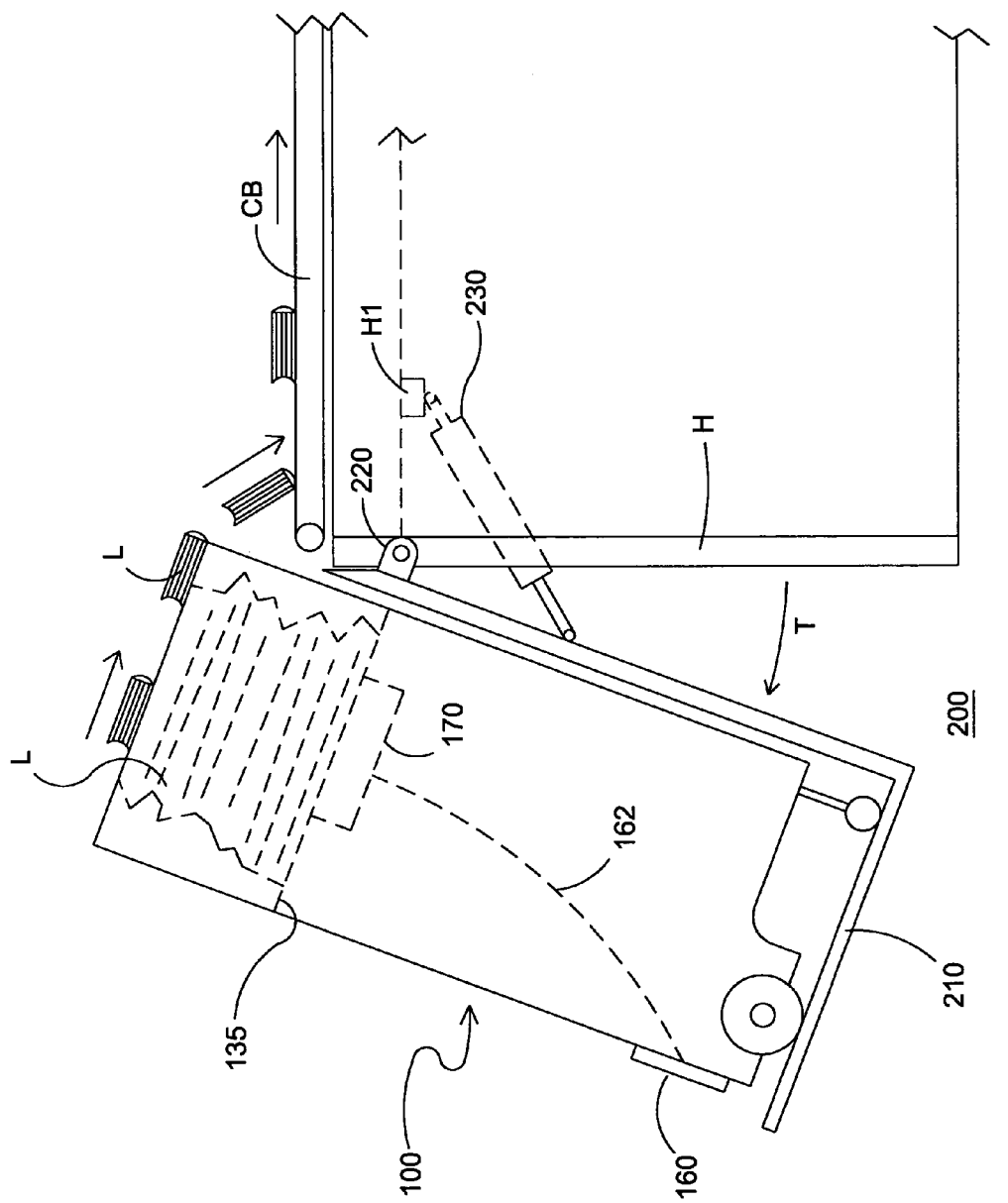
FIG. 2a is an illustration of the combination of FIG. 2, in use.

Referring to FIG. 2a, operation of system 200 is depicted in, e.g., an unloading cycle operative in response to a command signal from a central unloading control means. Such an unloading control means is not illustrated herein, but may be as generally disclosed in U.S. Pat. No. 6,422,457 issued to Mark R. Frich and Richard H. Jackson, entitled "ACCESS DEVICE FOR A MATERIALS DEPOSITORY"

("the '457 patent") and commercially available from the aforementioned Tech Logic Corp.

As commanded by unloading control means, tilting means 230 is actuated in extension, causing the hydraulic piston to extend a selected distance while exerting force against frame 210. Frame 210 is thereby forced to rotate (as indicated by direction T) about pivot member 220 to a selected distance past vertical corresponding to the selected extension distance of the hydraulic piston.

Upon completion of rotation or tilting of frame 210, unloading control means commands floor 135 to be raised as aforedescribed to a pre-set access level, whereupon library articles L slide freely by way of gravity off floor 135 and onto conveyor belt CB. Belt CB may then, for example, transport articles L to a receiving area of a library for check-in processing. The controlled movement of floor 135 in this exemplary unloading cycle is preferably achieved as taught in detail in the '770 patent. It is to be appreciated that articles L may freely slide out of bin 100 because floor 135 reaches uppermost housing plane P. Accordingly, articles L are not impeded or blocked in their movement from bin 100 by any wall member of housing 110.

It is also to be recognized that the construction and operation of bin 100, enabling floor 135 to reach plane P and be "flush" with the top of housing 110, effectively accommodates or provides so-called "de-shingling" or orderly stacking and un-stacking of the library articles.

It is also to be particularly appreciated that the bin and system of the instant invention are particularly suited, alone or in combination, for use with various library handling and circulation devices and systems including book depositories, conveyors, book binding orientation detectors, library cart loaders, and check-in/out cataloging and security controllers. Such devices and systems may be as those disclosed in, for example, issued patents of the inventor herein (e.g., the aforementioned '770 and '457 patents, and U.S. Pat. Nos. 6,074,156; 6,203,262; and 6,257,816). Each of these patents is hereby incorporated herein by reference thereto.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

Lastly, the choice, of course, of the mechanical size and strength of various components are all a matter of design choice depending upon the desires of the use and the articles intended to be received by the bin.

Accordingly, these and other various changes or modifications in form and detail of the present invention may also be made therein, again without departing from the true spirit and scope of the invention as defined by the appended claims.

What is claimed is:

1. A self-contained bin for library articles, comprising:
   a bin housing having a chamber defined by an uppermost housing plane and by substantially vertical pairs of (i) opposing side wall members and (ii) opposing forward and rearward wall members;
   a floor member within said chamber having a top surface, a bottom surface, and at least a pair of opposing cable apertures therethrough;
   at least a pair of cables for suspending said floor member within said chamber, said cables each having a first cable end and a second cable end, wherein (i) each said first cable end is secured in opposing relationship, respectively, to a selected wall member proximate to said uppermost housing plane, and (ii) each cable passes through, respectively, a corresponding one of said at least a pair of opposing cable apertures through said floor member; and
   a reversible cable driver secured to said bottom surface of said floor member with said second cable ends being secured to said driver, wherein (i) clockwise rotational motive force of said driver causes said floor member to climb upward on said cables to said uppermost housing plane, and (ii) counter-clockwise rotational motive force of said driver causes said floor member to descend downward from said uppermost housing plane.

2. The bin of claim 1, further comprising:
   an article level sensing means secured to said housing for detecting a presence or absence of articles on said top surface of said floor member at a pre-set access level; and
   a driver control means responsive to said article level sensing means for selectively (i) causing said floor member to descend downward from said uppermost housing plane as articles are piled upon said floor member during a loading cycle, to lower said floor member to a position at which said articles are just below said pre-set access level; and (ii) causing said floor member to climb upward toward said uppermost housing plane as articles are removed from said floor member during an unloading cycle, to raise said floor member to a position at which said articles are just above said pre-set access level.

3. The bin of claim 1, further comprising a plurality of wheels secured to bottom portions of said bin housing opposite said uppermost housing plane, for wheeled transportation of said bin.

4. The bin of claim 2, wherein:
   said article level sensing means further provides an output indicative of a presence or absence of any article piled on said floor at said pre-set access level; and
   said driver control means is responsive to said output of said article level sensing means, for selectively causing said driver to operate to control a position of said floor such that an uppermost article piled on said floor remains at said pre-set access level.

5. The bin of claim 1, further including:
   an unloading system having (i) a receiving frame for receiving said bin thereon, and (ii) a frame tilting means for tilting said receiving frame when said bin is located thereon, such that articles on said floor member of said bin at said uppermost housing plane may slide off of said floor member and away from said bin.

6. The bin and unloading system of claim 5, further including:
   an unloading control means for automatically controlling said tilting and unloading of said bin.

7. A bin for library articles, comprising:
   a bin housing having a chamber defined by an uppermost housing plane and by substantially vertical pairs of (i) opposing side wall members and (ii) opposing forward and rearward wall members;
   a floor member within said chamber having a toe surface, a bottom surface, and at least a pair of opposing cable apertures therethrough;
   at least a pair of cables for suspending said floor member within said chamber, said cables each having a first cable end and a second cable end, wherein (i) each said first cable end is secured in opposing relationship, respectively, to a selected wall member proximate to said uppermost housing plane, and (ii) each cable passes through, respectively, a corresponding one of said at least a pair of opposing cable apertures through said floor member;

a reversible cable driver secured to said bottom surface of said floor member with said second cable ends being secured to said driver, wherein (i) clockwise rotational motive force of said driver causes said floor member to climb upward on said cables to said uppermost housing plane, and (ii) counter-clockwise rotational motive force of said driver causes said floor member to descend downward from said uppermost housing plane;

an article level sensing means secured to said housing for detecting a presence or absence of articles on said top surface of said floor member at a pre-set access level; and a driver control means responsive to said article level sensing means for selectively (i) causing said floor member to descend downward from said uppermost housing plane as articles are piled upon said floor member during a loading cycle, to lower said floor member to a position at which said articles are just below said pre-set access level; and (ii) causing said floor member to climb upward toward said uppermost housing plane as articles are removed from said floor member during an unloading cycle, to raise said floor member to a position at which said articles are just above said pre-set access level.

8. The bin of claim 7, wherein:

said article level sensing means further provides an output indicative of a presence or absence of any article piled on said floor at said pre-set access level; and said driver control means is responsive to said output of said article level sensing means, for selectively causing said driver to operate to control a position of said floor such that an uppermost article piled on said floor remains at said pre-set access level.

9. A bin for library articles, comprising:

a bin housing having a chamber defined by an uppermost housing plane and by substantially vertical pairs of (i) opposing side wall members and (ii) opposing forward and rearward wall members;

a floor member within said chamber having a top surface, a bottom surface, and at least a pair of opposing cable apertures therethrough;

at least a pair of cables for suspending said floor member within said chamber, said cables each having a first cable end and a second cable end, wherein (i) each said first cable end is secured in opposing relationship, respectively, to a selected wall member proximate to said uppermost housing plane, and (ii) each cable passes through, respectively, a corresponding one of said at least a pair of opposing cable apertures through said floor member;

a reversible cable driver secured to said bottom surface of said floor member with said second cable ends being secured to said driver, wherein (i) clockwise rotational motive force of said driver causes said floor member to climb upward on said cables to said uppermost housing plane, and (ii) counter-clockwise rotational motive force of said driver causes said floor member to descend downward from said uppermost housing plane; and an unloading system having (i) a receiving frame for receiving said bin thereon, and (ii) a frame tilting means for tilting said receiving frame when said bin is located thereon, such that articles on said floor member of said bin at said uppermost housing plane may slide off of said floor member and away from said bin.

10. The bin and unloading system of claim 9, further including:

an unloading control means for automatically controlling said tilting and unloading of said bin.

* * * * *